US007179764B2

(12) United States Patent
Basso et al.

(10) Patent No.: US 7,179,764 B2
(45) Date of Patent: Feb. 20, 2007

(54) ZEOLITE/SIC COMPOSITES AND THEIR USE IN CATALYSIS

(75) Inventors: Stephan Basso, Eghisheim (FR); Jean-Philippe Tessonnier, Hangenbieten (FR); Cuong Pham-Huu, Saverne (FR); Marc J. Ledoux, Strasbourg (FR); Gauthier Wine, Strasbourg (FR)

(73) Assignees: SICAT, Paris (FR); Centre National de la Recherche Scientifique, Paris (FR); Universite Louis Pasteur de Strasbourg, Strasbourg (FR)

( * ) Notice: Subject to any disclaimer, the term of this patent is extended or adjusted under 35 U.S.C. 154(b) by 0 days.

(21) Appl. No.: 10/345,417

(22) Filed: Jan. 16, 2003

(65) Prior Publication Data

US 2003/0162649 A1  Aug. 28, 2003

(30) Foreign Application Priority Data

Jan. 17, 2002  (FR) .................................... 0200541

(51) Int. Cl.
*B01J 29/04* (2006.01)
(52) U.S. Cl. .......................................... 502/60; 502/79
(58) Field of Classification Search .................... 502/4, 502/60, 64, 71, 77, 78, 79
See application file for complete search history.

(56) References Cited

U.S. PATENT DOCUMENTS 5,895,769 A * 4/1999 Lai ................................ 502/4

FOREIGN PATENT DOCUMENTS

| JP | 06 182214 A | 7/1994 |
| JP | 08057305 A | 3/1996 |
| WO | WO 98 06495 A | 2/1998 |

OTHER PUBLICATIONS

N. Van Der Puil: "Development and Catalytic Testing of Zeolitic Coatings" PhD Thesis Delft University of Technology, Delft, NL May 13, 1997.
G. Wine, J. P. Tessonnier, C. Pham-Huu and M. J. Ledoux: "Beta Zeolite Supported on a Macroscopic Pre-Shaped SiC as a High Performance Catalyst for Liquid-Phase Benzoylation" Chemical Communications, No. 20, Oct. 21, 2002.
Seijger G B F et al: "In Situ Synthesis of Binderless ZSM-5 Zeolitic Coatings on Ceramic Foam Supports" Microporous and Mesoporous Materials Elsevier Science Publishing, New York, US, vol. 39, No. 1-2, Sep. 2000.
Mikkelsen O et al.: "Use of Isotopic Labeling for Mechanistic Studies of the Methanol-to-Hydrocarbons Reaction. Methylantion of Toluene with Methanol Over H-ZSM-5, H-mordenite and H-beta" Microporous and Mesoporous Materials, Elsevier Science Publishing, New York, US, vol. 40, No. 1-3, Nov. 2000.
Van Der Puil N et al: "Preparation and Catalytic Testing of Zeolite Coatings on Preshaped Alumina Supports" Microporous and Mesoporous Materials, Elsevier Science Publishing, New York, US, vol. 27, No. 1, Jan. 1999.
Re Lai et al., "Growth of ZSM-5 Films on Alumina and Other Surfaces", *Microporous and Mesoporous* Materials vol. 37, 2000, pp. 9-19.
R. Van Grieken et al., "Anomalous Crystallization Mechanism in the Synthesis of Nanocrystalline ZSM-5", Microporous and Mesoporous Materials, vol. 39, 2000, pp. 135-147.
Oyvind Mikkelsen et al., "Use of Isotopic Labeling for Mechanistic Studies of the Methanol-to-Hydrocarbons Reaction. Methylation of Toluene with Methanol Over H-ZSM-5, H-Mordenite and H-Beta", Microporous and Mesoporous Materials, vol. 40, 2000, pp. 95-113.
J. Caro et al., "Zeolite Membranes—State of Their Development and Perspective", Microporous and Mesoporous Materials, vol. 38, 2000, pp. 3-24.
Claus J.H. Jacobsen et al., "Zeolites by Confined Space Synthesis—Characterization of the Acid Sites in Nanosized ZSM-5 by Ammonia Desorption and $^{27}$Al/$^{29}$Si-Mas NMR Spectroscopy", Microporous and Mesoporous Materials, vol. 39, 2000, pp. 393-401.
M.A. Camblor et al., "Characterization of Nanocrystalline Zeolite Beta", Microporous and Mesoporous Materials, vol. 25, 1998, pp. 59-74.
T.F. Degnan et al., "History of ZSM-5 Fluid Catalytic Cracking Additive Development at Mobil", Microporous and Mesoporous Materials, vol. 35-36, 2000, pp. 245-252.
J.S. Buchanan, "The Chemistry of Olefins Production by ZSM-5 Addition to Catalytic Cracking Units", Catalysis Today, vol. 55, 2000, pp. 207-212.
N. van der Puil et al., "Preparation and Catalytic Testing of Zeolite Coatings on Preshaped Alumina Supports", Microporous and Mesoporous Materials, vol. 27, 1999, pp. 95-106.
Ahmed K. Aboul-Gheit[a] et al, "Catalytic Para-Xylene Maximization II—Alkylation of Toluene with Methanol on Platinum Loaded H-ZSM-5 Zeolite Catalysts Prepared Via Different Routes", Applied Catalysis A: General vol. 179, 1999, pp. 107-115.
J.C. Jansen[a] et al., "Zeolitic Coatings and Their Potential Use in Catalysis", Microporous and Mesoporous Materials, vol. 21, 1998, pp. 213-226.
Ahmed K. Aboul-Gheit et al., "Catalytic *Para*-Xylene Maximization IV. Hydroisomerization of *Meta*-Xylene on Catalysts Containing Platinum on Differently Steamed H-ZSM-5", Applied Catalysis A: General, vol. 209, 2001 pp. 179-191.

* cited by examiner

*Primary Examiner*—Jonathan Johnson
(74) *Attorney, Agent, or Firm*—Susan E. Shaw McBee

(57) ABSTRACT

The invention relates to a composite formed of a zeolite (such as ZSM-5 zeolite, β-zeolite and silicalite) deposited on a rigid support, wherein the rigid support comprises silicon carbide (SiC) with a specific surface area BET of at least 5 $m^2/g$. Preferably, the support is a β-SiC foam with a specific area of between 10 and 500 $m^2/g$. This composite may be used as a catalyst and/or a catalyst support for chemical reactions in a gas or liquid medium. For example materials of the present invention are useful for example, in connection with cracking, acylation, alkylation and/or isomerization of hydrocarbons.

39 Claims, 9 Drawing Sheets

ZEOLITE/SIC COMPOSITES AND THEIR USE IN CATALYSIS

CLAIM FOR PRIORITY

The present application claims priority under 35 U.S.C. § 119 from French Patent Application No. 02-00541 filed Jan. 17, 2002, the content of which is incorporated herein by reference in its entirety.

BACKGROUND OF THE INVENTION

1. Field of the Invention

This invention relates to the preparation of zeolite/SiC composites and their use as a catalyst or a catalyst support for chemical reactions in the gaseous or liquid phase.

2. Description of Related Art

Materials with a zeolitic structure are used in many industrial processes as catalysts, and particularly in the petrochemical industry. The article "Zeolithes: Catalysts for Organic Syntheses" by W. Hölderich, M. Hesse and F. Näumann, published in Angewandte Chemie Int. Ed. Engl. 27, p. 226–246 (1988), contains a long list of chemical reactions that could be catalysed by zeolites. U.S. Pat. No. 5,994,603 (Exxon) shows the use of a zeolite-based catalyst for methylation of toluene.

However, due to the small size of the zeolite crystals, it is often difficult to use them directly, due to pressure loss phenomena in chemical reaction vessels and systems. The solution to this problem usually adopted consists of adding a binder to the crystals, usually a silicon oxide or aluminium oxide type of binder, and preparing extruded bodies. This method has the disadvantage that the binder is not chemically inert. Consequently, parasite reactions can occur under catalyst usage conditions. Furthermore, the binder may make part of the zeolite inaccessible to the reagents.

Research work has been carried out to overcome these disadvantages that has been aimed towards the synthesis of supported zeolite-type materials. The article "Growth of ZSM-5 films on alumina and other surfaces" by R. Lai et al, published in Microporous and Mesoporous Materials vol. 37, p. 9–19 (2000), describes growth of ZSM-5 type zeolite films on the surface of tubes or plates made of $\alpha$-$Al_2O_3$, zirconia and quartz, as well as their use for gas separation.

Other articles deal particularly with the synthesis of supported zeolites for use in catalysis. The article "Zeolite coatings and their potential use in catalysis" by J. C. Jensen et al, published in Microporous and Mesoporous Materials, vol. 21, p. 213–226 (1998), describes different synthesis methods used and the different substrates (supports) most frequently used for the preparation of supported zeolite type composites: $\alpha$-$Al_2O_3$ or $\gamma$-$Al_2O_3$ extrusions or pellets, monoliths of Si, $TiO_2$, $\alpha$-$Al_2O_3$, plates of stainless steel, quartz, pressed carbon, and glass, as well as $\alpha$-$Al_2O_3$ foam, carbon fibres, vegetable fibres, steel wires, and even inert materials such as Teflon.

The use of silicon carbide supports for the deposition of zeolites is known in itself. Patent application WO 98/06495 (Technische Universiteit Delft) mentions the deposition of zeolites on SiC without giving any further information. The article "Preparation and catalytic testing of zeolite coatings or preshaped alumina supports" by N. Van der Puil et al, published in Microporous and Mesoporous Materials, vol. 27, p. 95–106 (1999), describes the synthesis of MFI structural type zeolites (ZMS-5, Silicalite-1) or BEA (Beta) type zeolites supported on $\alpha$-$Al_2O_3$ pellets and extrusions. The use of SiC and SiC/$Al_2O_3$ as a support for the synthesis of such composites is also known.

The deposition of zeolites on porous ceramics is described in an article by G. B. F. Seiger et al, "In situ synthesis of binderless ZSM-5 zeolitic coatings on ceramic foam supports", published in Microporous and Mesoporous Materials, vol. 39, p. 195–204 (2000). However, shaping of these materials is difficult, and they are fragile and expensive. The doctorate thesis "Development and catalytic testing of zeolitic coatings" by N. van der Puil, presented on May 13, 1997 at Delft University of Technology, Delft, Netherlands, describes the synthesis of beta zeolite supported on $\alpha$-$Al_2O_3$ pellets and extrusions and on SiC grains. Patent application JP 06182214 A mentions the use of zeolite/SiC composites as a combustion catalyst support.

Most supports used in the past, such as silica (glass, quartz) or densified alumina have several other disadvantages; namely, they are not chemically inert, and in particular react with the zeolite synthesis medium by partially dissolving in it, such that the initial composition of the synthesis gel is altered. Furthermore, these supports have a very low specific surface area, typically of the order of 0.1 to 5 $m^2/g$, such that the quantity of zeolite rarely exceeds 10% of the composite by mass. Finally, another big disadvantage of supports such as silica and alumina is that the zeolite adheres poorly to them and separates easily forming a powder. These disadvantages are a nuisance for the use of supported zeolites, particularly in the chemical industry, since they reduce the life of the catalyst and lower the efficiency and selectivity of the target reaction by direct loss of the active phase that can be drained by the gas or liquid to be treated. Furthermore, when the supported zeolite has at least partially disintegrated, the support may be exposed to the reactive environment; this support can then catalyse parasite reactions.

The problem related to poor adhesion has not been satisfactorily solved. Some documents (see article by G. B. F. Seijger et al., the doctorate thesis by N. Van der Puil, patent application JP 06182214 A and patent application WO 98/06495 mentioned above) describe the use of chemically inert supports, and particularly SiC. However $\alpha$-SiC, often called "Non-porous SiC" was used in all these cases. As described by N. Van der Puil in his doctorate thesis, the anchor force of zeolite crystals at the support surface is very small and part of the zeolite is detached during post-synthesis treatments carried out to obtain the composite in its final form. Several solutions have been proposed to overcome this problem.

Seijger et al (see the previously mentioned article) have succeeded in depositing an important charge of zeolite on an SiC/$Al_2O_3$ ceramic foam. However, the support is embrittled during synthesis and the composite synthesized by such a method is brittle.

Patent application JP 06182214 A describes another method involving calcinating SiC at high temperature to form a layer of $SiO_2$ at its surface. If the support thus prepared is subsequently put into the presence of an aqueous solution containing an aluminium source under hydrothermal conditions, the silica layer will be transformed into zeolite. This composite is then used as a catalyst support to carry out combustion reactions. Although this method leads to strong interaction between the zeolite and the support, the zeolite charge remains low because only the surface layer composed of $SiO_2$ can be transformed.

Patent application WO 98/06495 presents another support preparation method, whereby the support is put in the presence of a solution containing a structuring material of the same nature as that used to prepare the zeolite synthesis gel. After the gel has been prepared, the support is brought into the presence of the synthesis gel under hydrothermal conditions. This method can give a good anchorage of the zeolite on an $\alpha$-$Al_2O_3$ support.

In each case in which SiC was designed as a support for a zeolite-SiC type composite, only $\alpha$-SiC which is non-porous and therefore has a low specific surface area (<5 $m^2/g$) was used. It has been demonstrated (see previously mentioned documents) that the above method may often produce one or more of the following disadvantages, that either (i) the zeolites are only weakly anchored to the SiC surface, or (ii) that the synthesis conditions make the final composite brittle, and/or (iii) that the synthesis only creates a very thin layer of zeolite on the support, such that the efficiency is always low. These various disadvantages all contribute to the result that those skilled in the art have now abandoned the use of SiC, and instead typically use $\alpha$-$Al_2O_3$ for the synthesis of such composites.

SUMMARY OF THE INVENTION

A problem that the applicants attempted to solve with the instant invention was to obtain a composite material comprising zeolite and a rigid support which minimizes or even substantially avoids disadvantages of existing products. In connection with the present invention, it is desirable that the support in particular should have good mechanical strength under the conditions of use of the composite as a catalyst, should be easy to shape, should have a good chemical resistance, particularly in a basic environment (to enable synthesis of zeolites using a hydrothermal method) and with low catalytic activity under conditions of use of the composite as a catalyst (to reduce or prevent parasite reactions). It is yet further desirable that the support have good adhesion for the zeolite. It is also desirable that the support should preferably have a specific surface area of at least 5 $m^2/g$ so that a large quantity of zeolite can be deposited. The specific surface area of a catalyst is an important parameter in catalysis, particularly for catalytic reactions in the gaseous phase. Consequently it is desirable that the composite should preferably be fully and uniformly coated with zeolite, even in the pores of the support, without forming a thick layer, such that the reagents employed therewith are capable of accessing most, if not all the zeolite during use of the composite in catalytic reactions. Finally, the support should preferably have strong interaction with the zeolite so that it does not become detached from the said support during post-synthesis treatment operations and when the composite is used as a catalyst.

In accordance with these and other objects, the present invention is directed to a composite formed from zeolite deposited on a rigid support, wherein the rigid support comprises a silicon carbide (SiC) with a specific BET surface area of at least 5 $m^2/g$. Preferably, the support is a $\beta$-SiC foam with a specific BET surface area of between 10 and 400 $m^2/g$. The zeolite is advantageously selected from among zeolite ZSM-5, zeolite-$\beta$ and silicalite.

In yet further accordance with the present invention, there is provided another embodiment directed toward the use of a zeolite/SiC composite with a specific BET surface area of at least 5 $m^2/g$ as a catalyst or catalyst support useful for chemical reactions in a gaseous and/or liquid medium.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

(a) Composite ZSM-5 on $\beta$-SiC extrusions
(b) Composite ZSM-5 on $\alpha$-alumina extrusions
Black bars: microporous BET specific surface area
White bars: total BET specific surface area.

Figure 3:
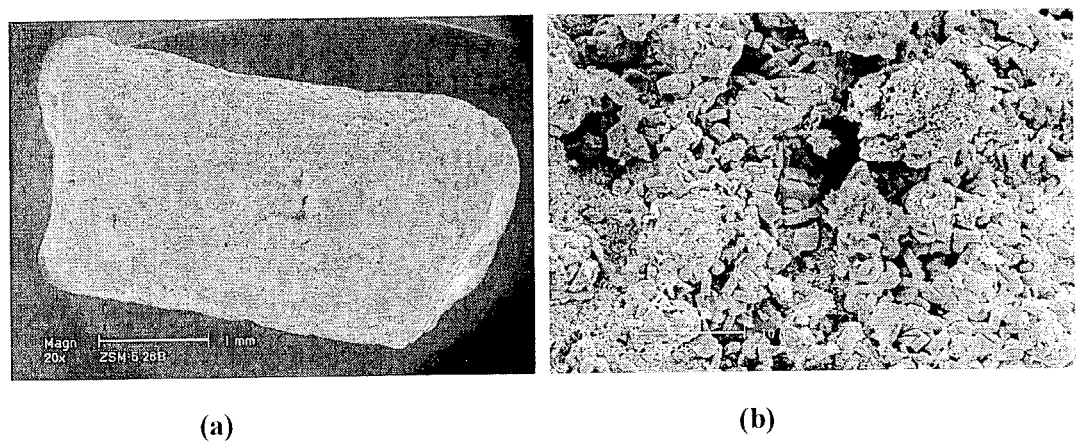

FIG. 3 shows two scanning electronic microscope (SEM) images of a composite according to the invention (ZSM-5/$\beta$-SiC) with different magnifications (image (a) with a magnification of about 20; image (b) with a magnification of about 2000).

Figure 4:
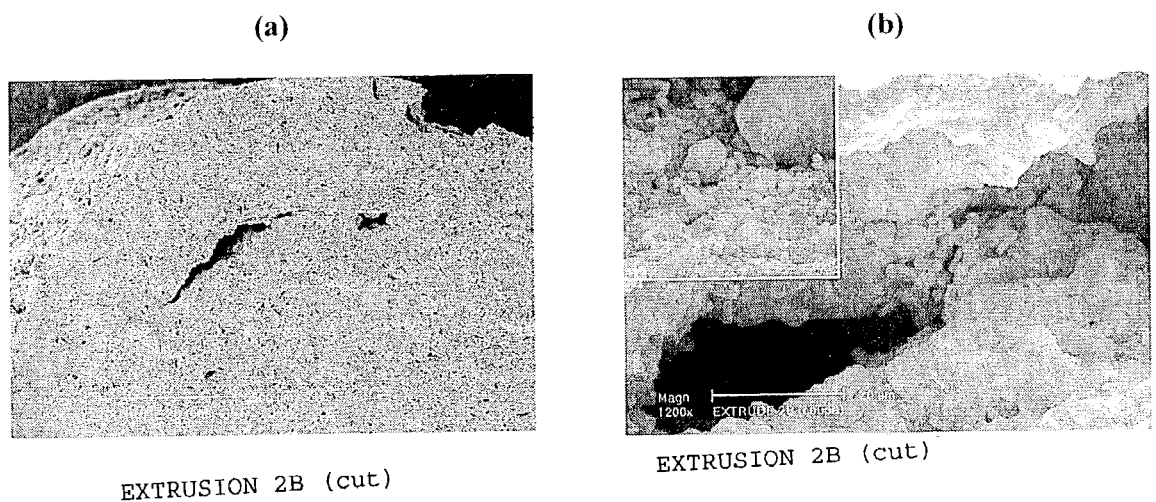

FIG. 4 shows two SEM images of cuts of a composite according to the invention (ZSM-5/$\beta$-SiC) with different magnifications (image (a) magnification about 50; image (b) magnification about 1200, the insert having a magnification zoom of 10 000 showing the internal wall of the $\beta$-SiC extrusion).

Figure 5:
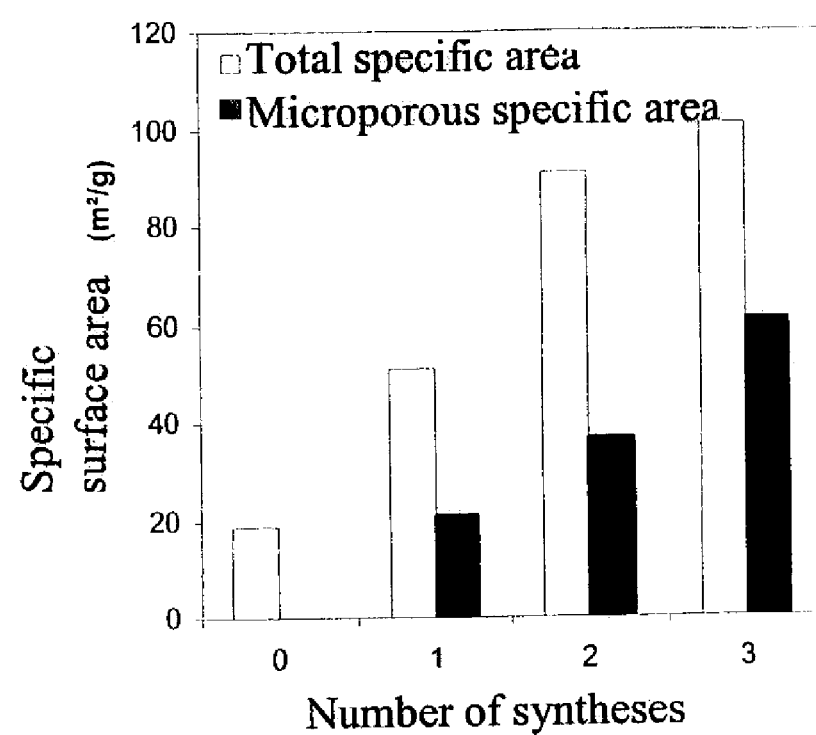

FIG. 5 shows total and microporous BET specific surface areas of a ZSM-5 composite on $\beta$-SiC according to the invention as a function of the number of successive syntheses of ZSM-5.

Black bars: microporous BET specific surface area
White bars: total BET specific surface area.

Figure 6:
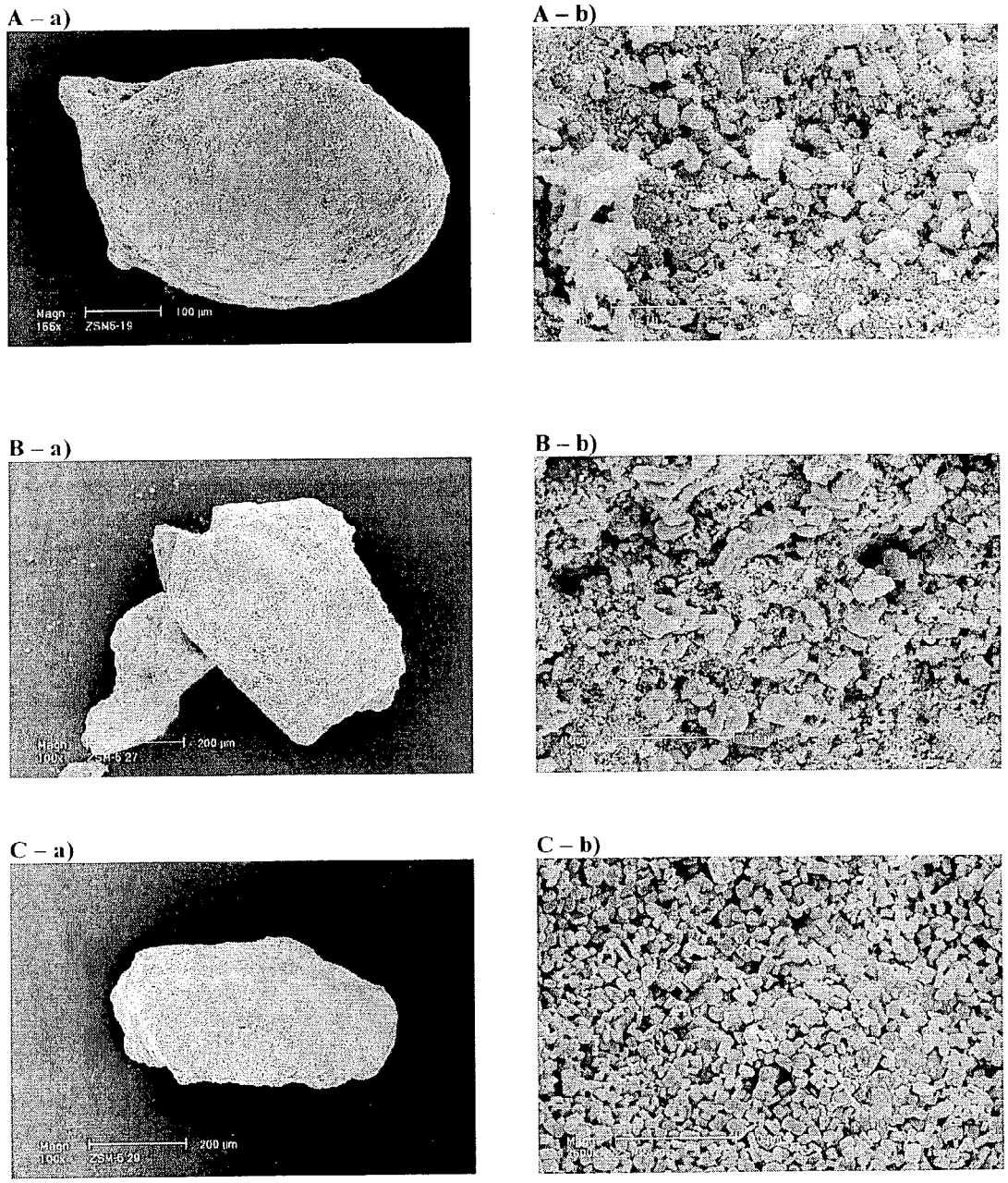

FIG. 6 shows two scanning electronic microscope images with different magnifications for each step of the synthesis of ZSM-5 on a grain of SiC according to the invention; after one (image A), two (images B) and three (images B) successive syntheses of ZSM-5 with low magnification (images A-a, B-a, C-a) and medium magnification (images A-b, B-b, C-b).

Figure 7:
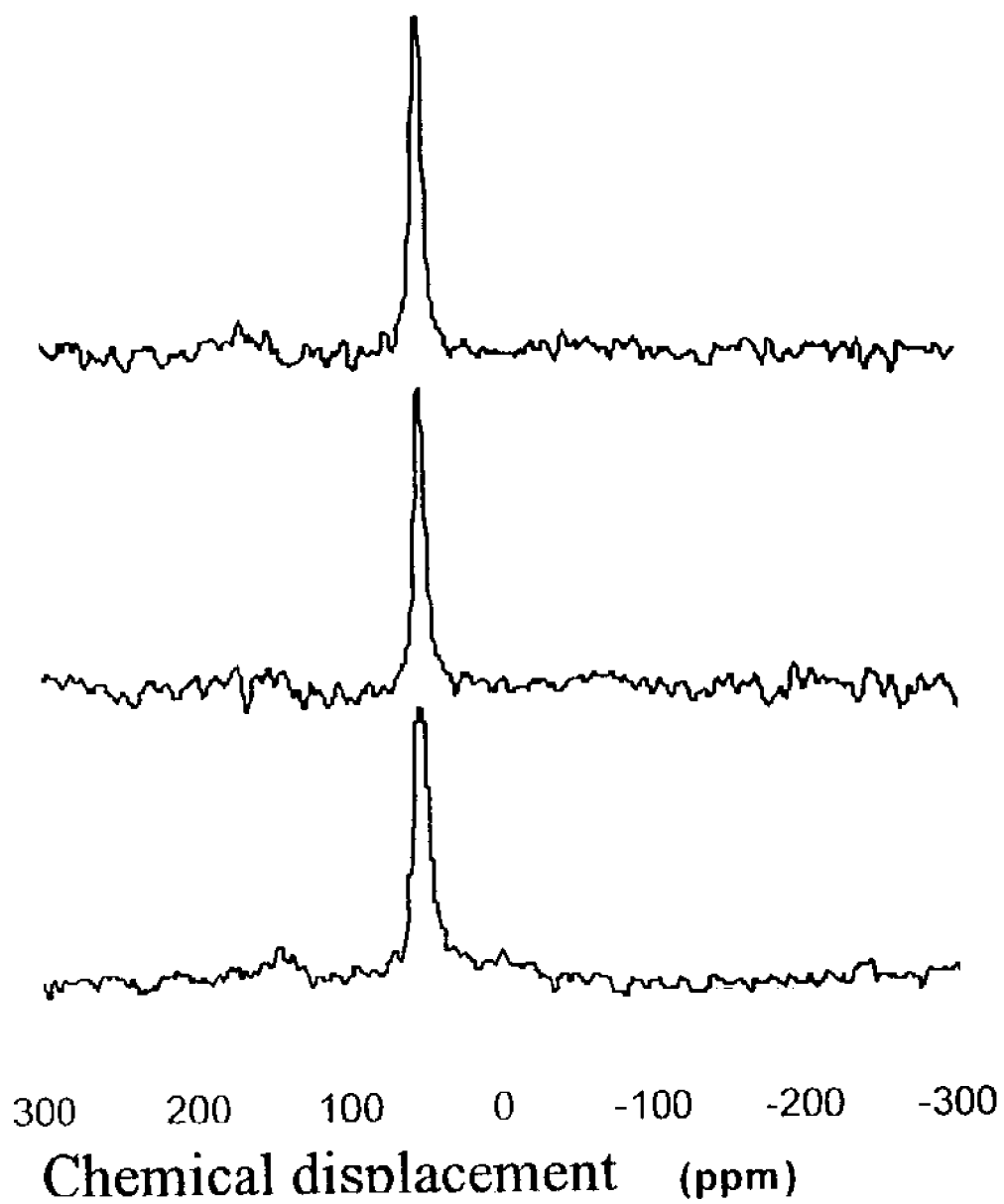

FIG. 7 shows the $^{27}Al$ NMR spectrum of SiC grains after one, two and three successive synthesis steps of ZSM-5.

Figure 8:
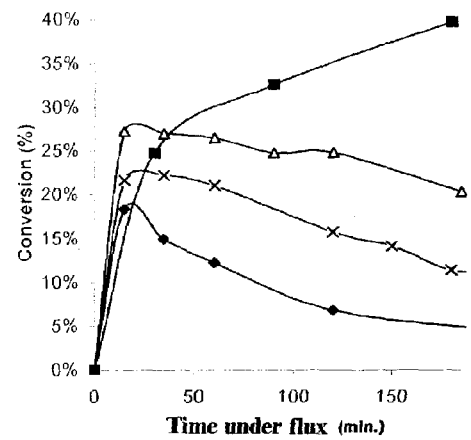
Figure 8:
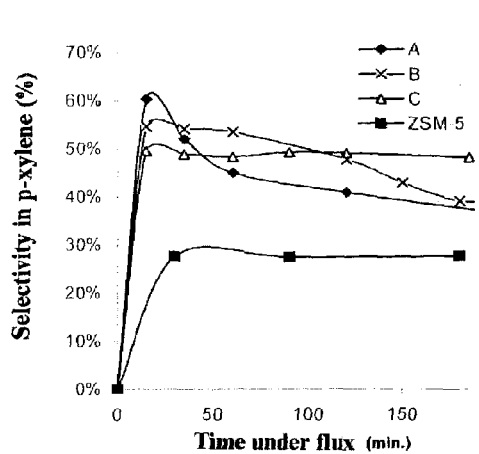
Figure 8:
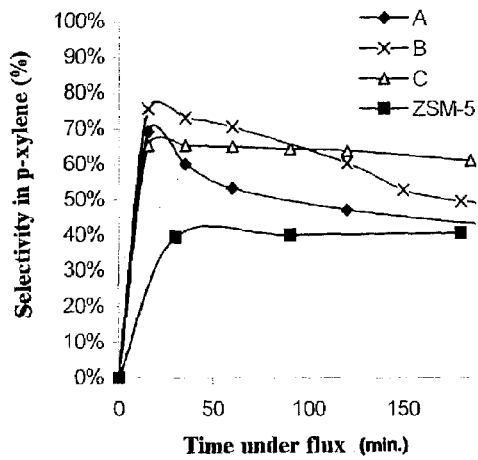

FIG. 8 shows the toluene conversion rate (a), the paraxylene selectivity ratio of toluene methylation within reaction products (b) and the paraxylene selectivity ratio within the xylene fraction (c) as a function of the flux time for the different ZSM-5/SiC composites according to the invention. The reaction is carried out at 375° C. on 500 mg of catalyst.

Figure 9:
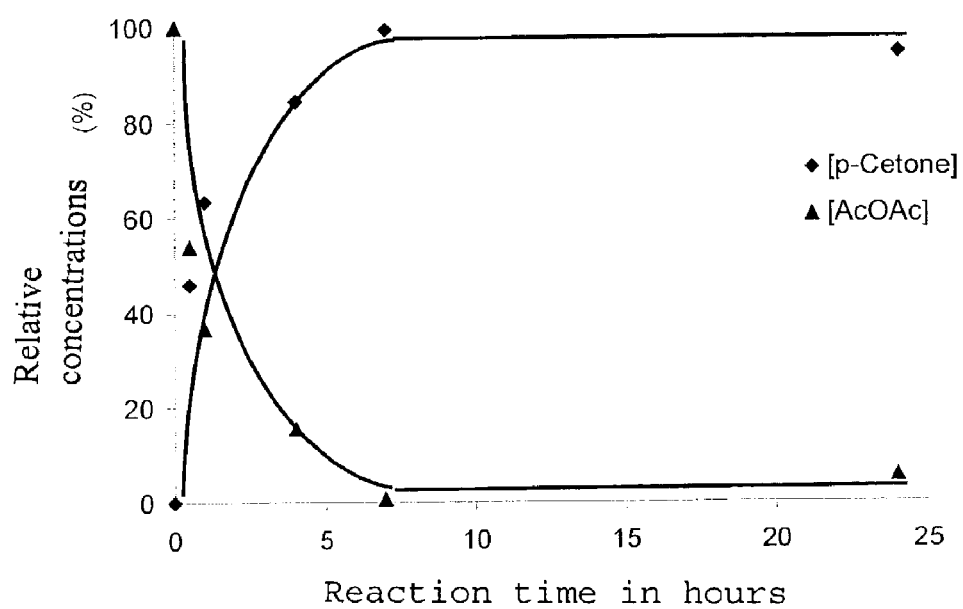

FIG. 9 shows the relative conversion into acetic anhydride and selectivity in para-methoxyacetophenone as a function of time for the catalytic acetylation reaction of anisole done on the Beta/SiC composite according to the invention.

DETAILED DESCRIPTION OF THE INVENTION

The applicants found that the use of a silicon carbide support with a $\beta$ structure ($\beta$-SiC) can overcome certain disadvantages according to prior art. Surprisingly, the applicant observed that materials with a zeolitic structure have excellent adhesion on a silicon carbide support with a $\beta$ structure. For the purposes of this invention, it is desirable to have a support characterized by a specific BET surface area larger than traditional supports (silica, alumina) that have a specific area of the order of 0.1 to 5 $m^2/g$. Silicon carbide can be chosen, for example, from among different SiC based materials. Advantageously, the specific BET surface area of the silicon carbide support is at least 5 m²/g, but supports with a specific BET surface area of between 5 and 600 m²/g are preferred. Still more preferred supports have a specific BET surface area comprised between 10 and 600 m²/g, between 10 and 400 m²/g, and between 20 and 400 m²/g. Other preferred supports had a specific BET surface area comprised between 10 and 200 m²/g. Rigid supports are preferred ; by "rigid support", we mean a support with a shape other than powder, such as granules, monoliths, extrusions, grains, tubes, or fibres.

Within the framework of this invention, a highly advantageous support is a β-SiC support with a specific BET surface area on the order of from 10 to 100 m²/g. In one preferred embodiment of the invention, the applicant used SiC foam or grains or extrusions of SiC. For example, this type of material can be prepared using synthesis methods well known in the art, for example, those described in patents EP 0 313 480, EP 0 440 569, U.S. Pat. No 5,217,930, EP 0 511 919, EP 0 543 751 and EP 0 543 752. According to these methods, materials with different sizes and shapes such as sticks, monoliths, extrusions, grains or tubes can be synthesized. These types and shapes of β-SiC give good results, but other sizes and shapes of SiC can also be used within the framework of this invention.

All values of the specific surface area were determined by adsorption of nitrogen at the temperature of liquid nitrogen according to the BET method, which is well known to those skilled in the art.

Composites according to the present invention may comprise any material with a zeolitic type structure. Zeolites are materials with a three-dimensional structure for which the skeleton comprises a sequence of tetrahedrons $TO_4$, where T represents an atom of silicon or optionally aluminium. Although the term "zeolite" is frequently used in the case of aluminosilicates, those skilled in the art know that some or all of silicon and aluminium atoms can be replaced by other elements. For example, silicon can be replaced by other tetravalent elements, for example tin, germanium, phosphorus or a mix of these elements, without being restricted to these elements, and aluminium can be replaced by other trivalent elements for example such as boron, titanium, gallium, indium or a mix of these elements, without being restricted to these elements. Consequently, the applicant uses the terms "zeolite", "zeolites", "zeolitic material" within this patent to define any material with a zeolitic type structure known to those skilled in the art, without restricting themselves to materials containing only silicon and aluminium. This includes aluminosilicates, metallosilicates (for example such as gallosilicates, chromosilicates, borosilicates, ferrosilicates, tinanosilicates without being restricted to these elements), silicoaluminophosphates (SAPO), metalloaluminophosphates (MeAPO), aluminophosphates (ALPO) and metallophosphates, without being restricted to these materials. The applicant uses the term "aluminosilicic zeolite" herein to refer to zeolites containing only silicon and aluminium as skeleton atoms.

Preferably, but without restriction, the zeolite/SiC composites may include AEL, BEA, CHA, CLO, ERI, EUO, FAU, FER, HEU, LTA, LTL, MAZ, MEI, MEL, MFI, MOR, MTT, MTW, MWW, OFF, PHI, SOD, TON type structural zeolites, or a mix of zeolites with these different types of structures. These zeolites are described in "Atlas Of Zeolite Structure Types", by W. M. Meier, and D. H. Olson, Butterworth-Heinemann, 3$^{rd}$ edition, 1992, the content of which is incorporated herein by reference. Those skilled in the art will necessarily be familiar with this book that also defines the normalized nomenclature of zeolites.

In some embodiments of the present invention, it is preferable to employ zeolite ZSM-5, which is used industrially as an isomerization catalyst and as an additive for cracking, zeolite-β and silicalite. The zeolite may be deposited, for example, by a hydrothermal method using techniques known to those skilled in the art.

In one advantageous preparation method, a β-SiC support is calcinated at 900° C. for about 2 hours to transform the support surface layer (typically 3 nm) of oxide and oxicarbide into silica. This surface layer of silica is advantageously between 1 nm and 10 nm thick. The applicant has observed that in this preparation method, the outer layer thus formed is not transformed into zeolite as is the case in patent JP 06182214 mentioned above, but acts as an anchor point for it. If the silica layer is too thin, the anchorage of this zeolite layer is not as good. If the silica layer is too thick, it dissolves partially in the zeolite synthesis medium. The thickness of this layer may be determined by XPS (X-Ray Photoelectron Spectroscopy). A particularly advantageous thickness range for the silica layer is between 1.5 nm and 5 nm.

The composite can be synthesized in situ in the presence of the pretreated support. Thus, synthesis of the composite includes preparing a synthesis gel, for which the composition and the preparation method are generally known to those skilled in the art. After an aging period, the support can be suitably added to the gel and the mix is transferred into a receptacle adapted to hydrothermal syntheses, for example, an autoclave with a Teflon lining. The hydrothermal synthesis can then be conducted under conditions known to those skilled in the art. The composite is recovered, and any post-synthesis treatments are carried out using known methods.

Industrial application of composites according to the invention is particularly related to the domain of chemicals and petrochemicals. Composites according to the invention may advantageously be used as catalysts for chemical reactions in a gaseous or liquid phase. They may also be used as a support for catalysts, in other words an active phase (for example a metallic compound that may be reduced) is applied onto the composite to form a catalyst for chemical reactions in the gaseous or liquid phase. For example, composites according to the invention may be used as catalysts, or as catalyst supports, for example, for cracking, acylation, alkylation or isomerization reactions of hydrocarbons.

Reactions that can be catalysed by a composite of the present invention include reactions catalysed by known zeolites, as well as those capable of being catalysed by the same or similar mechanism. For example, it is known that commercially available zeolite H-ZSM-5 (SC) catalyses the synthesis of xylene from toluene or methanol (see the article "Use of isotropic labelling for mechanistic studies of the methanol-to-hydrocarbons reaction. Methylation of toluene with methanol over H-ZSM-5, H-mordenite and H-beta" by Ø. Mikkelsen et al, published in Microporous and Mesoporous Materials, vol. 40, p. 95–113 (2000), the content of which is incorporated herein by reference), but without any selectivity for the paraxylene isomer: the para/meta/ortho distribution is 39%/38%/23%.

The applicants observed that composites according to the invention can catalyse this reaction with good selectivity towards para-xylene. A highly interesting one of the three isomers (para-, ortho- and meta-xylene) is para-xylene since it can be transformed by oxidation into terephthalic acid, a compound used in manufacturing of polyester fibres and films. With composites according to the invention, a selectivity of more than 60% of para-xylene in proportion to all xylenes can be obtained. The stability of composites according to the invention is typically at least comparable to the stability of known zeolites.

Another application of composites according to the invention is in the fine chemicals domain. For example, the Friedel-Crafts reaction (that may be done in the form of alkylation or acylation) is frequently used in processes in the perfume manufacturing industry and in the pharmaceuticals industry. For example, this reaction can be used for the synthesis of aromatic ketones, which are very important intermediaries in the synthesis of drugs. Catalysts frequently used in industry include metal halides, such as $FeBr_3$, $AlCl_3$ or $SbCl_5$. Apart from environmental problems generated by their use, these catalysts are not very selective and their life is short. This is why they are gradually being replaced by solid acid catalysts, and more precisely by zeolites. Although zeolites solve many of these problems, they still have a limited life, essentially due to the extraction of aluminium from the aluminosilicated structure by products formed during the reaction. The applicants have observed that composites according to the invention have better selectivity than existing catalysts and good stability with time. Furthermore, the applicants have shown that catalysts of the present invention can be reused after a cleaning cycle, and that virtually their entire catalytic activity is typically retained. For example, the applicants have used the composite according to the invention for the synthesis of para-alkoxyacetophenone by the Friedel-Crafts reaction. The selectivity of the para isomer exceeds 90% or even 95%. For example, the applicants obtained para-methoxyacetophenone from anisole and acetic anhydride with a selectivity of more than 99%. Another example is the synthesis of p-methoxybenzophenone by the Friedel-Crafts acylation.

Another application of composites according to the invention is purification or depollution of exhaust gases from combustion engines, and particularly the oxidation of carbon monoxide into carbon dioxide, and the reduction of nitrogen oxides into nitrogen.

The following examples illustrate different embodiments of the invention and demonstrate its advantages; they do not restrict this invention.

EXAMPLES

Example 1

Preparation and Characterization of an ZSM-5/SiC Zeolite Composite

A composite comprising a ZSM-5 type zeolite (of the MFI structural type) is synthesized by hydrothermal method from a gel that contains the reactive species, using a method similar to that described in the article "Preparation and catalytic testing of zeolite coatings on preshaped alumina supports" by N. Van der Puil et al in Microporous and Mesoporous Materials, vol. 27, p. 95–106 (1999). The said gel is composed of water, tetraethoxysilane ($Si(OC_2H_5)_4$, abbreviation TEOS), nonahydrate aluminium nitrate (Al $(NO_3)_3 \cdot 9H_2O$) and tetrapropylammonium hydroxide ($N(C_3H_7)_4^+ \cdot OH$) (abbreviation TPAOH). Its equivalent molar composition in oxide is as follows:

6.6 $SiO_2$:0.100 $Al_2O_3$:1 $TPA_2O$:800 $H_2O$

The initial operating protocol is to take 24 g of water, 7.5 g of tetrapropylammonium hydroxide and 5.16 g of tetraethoxysilane and place them in a polypropylene flask with magnetic stirring. 0.28 g of nanohydrate aluminium nitrate is dissolved in 24 g of distilled water in another flask. The aluminium source is then added to the first flask. The gel is stirred and allowed to mature for 50 minutes, after which the support (1 g of extrusion or 3 g of grains with a size between 250 and 425 μm, previously calcinated to 900° C. for 2 hours, depending on the case) is added. After 10 minutes of additional maturing the mix is transferred into a Teflon lined autoclave. The autoclave is then placed in a drying oven at 150° C. for 7 hours. After 7 hours of crystallization at autogenic pressure, the autoclave is cooled and the material is filtered and washed thoroughly with distilled water and oven dried at 100° C. for several hours. The solid obtained is calcinated in air at 550° C. for 10 hours to decompose the organic skeleton. The composite is put in the presence of an $NH_4Cl$ solution at 1M and the mix is brought to reflux for 16 hours using a known technique to obtain the ammonium form of zeolite. The composite is then thoroughly washed with distilled water, and is dried and calcinated at 550° C. for 10 hours to obtain the acid form of zeolite and the definitive form of the composite.

The synthesis was done on supports with different natures: $\alpha$-$Al_2O_3$ and $\beta$-SiC extrusions. The initial total and microporous BET specific surface areas are 22.86 m$^2$/g and 0.00 m$^2$/g respectively for SiC extrusions, and 4.94 m$^2$/g and 0.62 m$^2$/g respectively for alumina extrusions.

Figure 1:
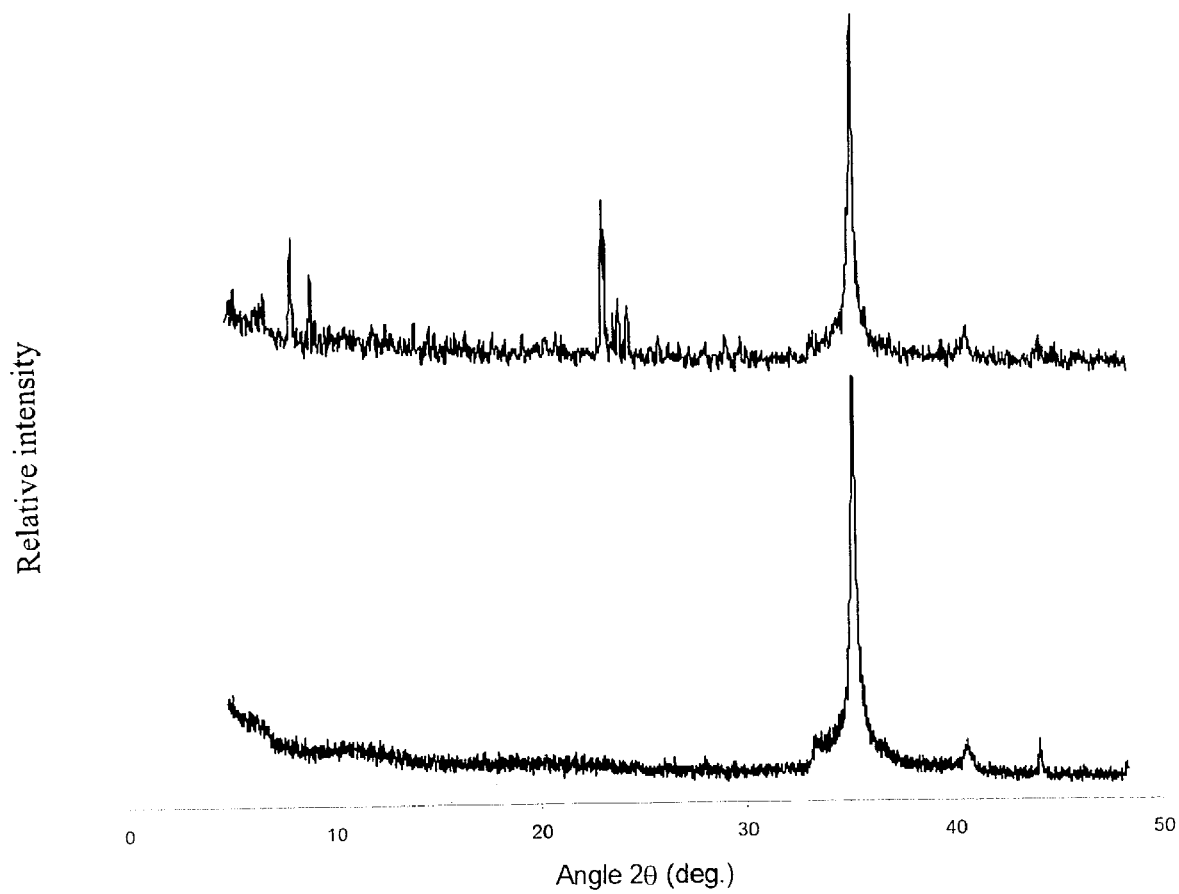
FIG. 1 shows diffraction peaks corresponding to zeolite ZSM-5 in a composite according to the invention, and in a bare support of $\beta$-SiC extrusions.

X-diffraction diagrams (FIG. 1) were made on ZSM-5/SiC composite powders using a Siemens D5000 diffractometer using non-monochromatic Cu $K_\alpha$ radiation. These peaks were indexed using the JCPDS (Joint Committee of Powder Diffraction Standards) data bank, incorporated herein by reference in its entirety. The diagram comprises peaks corresponding to the $\beta$-SiC substrate and zeolite ZSM-5 exclusively.

The formation of ZSM-5 on the support surface is also confirmed by the appearance of micropores during measurement of the BET specific surface areas and porous volumes by the adsorption of nitrogen at the temperature of liquid nitrogen using the BET method (see the article "Surface area and pore texture of catalysis" by G. Leofanti et al, published in Catalysis Today, vol. 41, p. 207–219 (1998), incorporated herein by reference in its entirety.). Table 1 shows values obtained before and after synthesis for SiC extrusions and grains:

TABLE 1

Specific BET surface area determined by adsorption of nitrogen at the temperature of liquid nitrogen

| Sample | Specific BET surface area [m$^2$/g] | |
| --- | --- | --- |
| | Total | Micropores |
| SiC extrusions | 22.86 | 0.00 |
| ZSM-5 composite on SiC extrusion | 28.82 | 3.59 |
| SiC grains | 18.67 | 0.00 |
| ZSM-5 composite on SiC grains | 50.99 | 20.97 |

Figure 2:
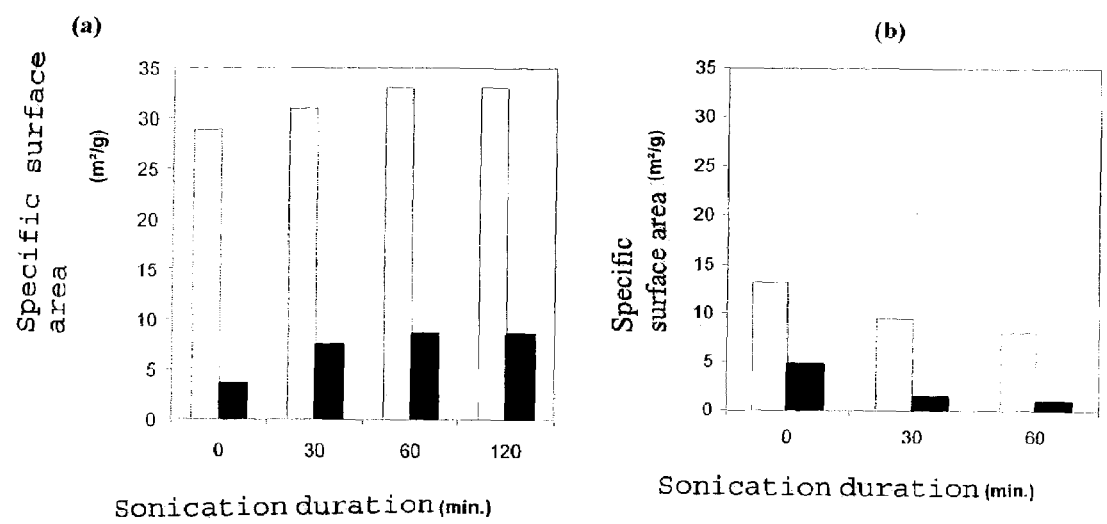
FIG. 2 compares the variation of total specific areas and microporous areas as a function of the exposure of the composite to ultrasounds (sonication) for a sample according to the state of the art and a sample according to the invention.

In order to simulate attrition that occurs on industrial catalysts and in reaction vessels and that affects the life of the catalyst, ultrasounds were applied to the composites for variable times (see the article by N. Van de Puil cited above, which is incorporated herein by reference in its entirety.). This test characterizes the adhesion force between the support and zeolite. After a given ultrasound treatment time, the specific BET surface area was measured by adsorption of nitrogen to observe whether or not there was any loss of part of the deposited zeolite. The results are shown in FIG. 2. No loss of any specific surface area on the ZSM-5/SiC composite according to the invention was observed. This means that the interaction between the support and the zeolite is strong. This interaction is potentially due to the fact that there is an oxide layer on the surface of the SiC that acts as an anchor point for the zeolite on the support. The small increase in the specific surface area is attributed to a remaining amount of synthetic gel that closed some pores and that was eliminated by the use of ultrasounds.

In the case of ZSM-5 on alumina extrusions according to the state of the art, it is observed that the composite material formed is not resistant to sonication, since almost all of the zeolite disappeared after 60 minutes. This corresponds to observations reported in the article mentioned by Van de Puil and co-workers in the case of ZSM-5 syntheses on different alumina supports. Furthermore, it was observed that less zeolite is deposited on the surface of alumina extrusions according to the state of the art, under similar conditions. Although it is a densified alumina, it is possible that a proportion dissolves in the synthesis gel, thus modifying the ratio of alumina. However it was known (see the article mentioned by R. Lai et al.), that an increase in the quantity of aluminium affects or even prevents crystallization.

This comparison clearly demonstrates the mechanical strength advantages due to the use of silicon carbide in this synthesis of composites based on supported zeolite.

The morphology of the support after synthesis and the crystal size were observed by scanning electronic microscope (SEM). SEM images (see FIG. 3) show that the morphology of the extrusion was not affected by the synthesis. Although no difference from the initial extrusions is immediately visible, if the magnification is increased, it can be seen that the entire surface of the support is covered by zeolite crystals. Two types of crystals can be distinguished, with different sizes, first, 2 µm×1 µm×0.5 µm hexagonal crystals, and second, nanocrystals with a diameter of about 20 nm. SEM images with different magnifications of a cut of an extrusion through the composite (see FIG. 4) clearly show that the zeolite was deposited over the entire β-SiC surface, even inside the pores. This very clearly illustrates the advantage of a β-SiC support instead of an α-SiC support: for an equivalent quantity of deposited zeolite, the zeolite is distributed over a larger area of the support and therefore forms a thinner layer than in the case of α-SiC. The result is that virtually all of the zeolite is easily accessible by reagents, when the composite is used according to the invention as a catalyst or catalyst support.

Example 2

Successive Deposition of Several Layers of ZSM-5 on SiC

Several successive syntheses were made on the same support composed of 250–425 µm grains of β-SiC previously calcinated for 2 hours at 900° C., in order to monitor the variation in the quantity of deposited zeolite and the dispersion of crystals on the surface of the support. The silicon carbide was the same as that used in Example 1.

FIG. 5 shows the variation of total and microporous specific surface areas as a function of the number of successive syntheses. It is observed that the total and microporous specific surface areas increase almost linearly.

Scanning electronic microscope (SEM) images of the ZSM-5/SiC composites obtained (see FIG. 6) show that the support surface is uniformly covered by different sizes of zeolite crystals varying from a few tens of nanometers to a few micrometers. Images with a medium magnification show that the quantity of crystals deposited increases with the number of syntheses, in accordance with measurements of specific areas. However, they also demonstrate that the quantity of nanocrystals tends to reduce and be replaced by ZSM-5 microcrystals. The most probable assumption is that nanocrystals act as germs, thus facilitating the crystalline growth step during subsequent syntheses.

Each sample is also analysed by nuclear magnetic resonance (NMR) with magic angle spinning (MAS-NMR) for $^{27}$Al and $^{13}$C nuclei. The $^{27}$Al RMN spectra can be used to distinguish between tetrahedral aluminium in the zeolite skeleton and extra-network aluminium. Aluminium with tetrahedral coordinance has a chemical displacement of 50 to 60 ppm, while the second with octahedral coordinance has a chemical displacement of 0 ppm (see the article by C. J. H. Jacobsen et al, "Zeolites by confined space synthesis—characterization of the acid sites in nanosized ZSM-5 by ammonia desorption and $^{27}$Al/$^{29}$Si-MAS NMR Spectroscopy" published in Microporous and Mesoporous Materials, vol. 39, P. 393–401 (2000), which is incorporated herein by reference in its entirety.).

For each sample, only one peak was observed corresponding to the aluminium engaged in the zeolitic skeleton structure (see FIG. 7). Therefore, these spectra demonstrate that the small aggregates observed with the SEM are actually zeolite nanocrystals and not another phase.

$^{13}$C NMR spectra are made for each of the three samples, to quantify the deposited ZSM-5. It is known that there are exactly two structuring molecules per zeolite grid. Consequently, if the peaks of each spectrum are integrated and if the areas are compared with the area of a reference sample with a known mass of zeolite, the mass of ZSM-5 of the sample considered can be determined. Therefore, knowing its total mass, the mass percentage of ZSM-5 can be determined for this sample. The mass percentage of ZSM-5 has to be known in order to correct the results of catalytic tests (see Example 3) for a unit mass of zeolite so that different catalysts can be compared with each other.

Example 3

Test of the Catalytic Activity of the ZSM-5/SiC Composite

The toluene methylation reaction for which ZSM-5 is used industrially was used to characterize the catalytic activity of ZSM-5 composites of SiC grains prepared according to example 2, after one zeolite synthesis step (sample A), two synthesis steps (sample B) and three synthesis steps (sample C). By comparison, an unsupported ZSM-5 zeolite synthesized from the same synthesis gel and under the same conditions as the composite was also studied. The reaction consists of making methanol react with toluene (molar ratio 1:1) in the presence of the catalyst according to the invention. The result is a mix of the three isomers (ortho, meta and para). The selectivity of the synthesis is determined compared with paraxylene.

The test was carried out as follows: a equimolar methanol/toluene mix is delivered to a "T" connector using an HPLC pump with a flow of 40 µl/min. The mix is then vaporised and carried by a helium flow (Air Liquide, helium N55, flow 20 cc/min) as far as the reaction vessel. The reaction vessel consists of a quartz U-tube on which a sintered material is formed, and on which 500 mg of catalyst are deposited. The reaction vessel is placed in a furnace that heats by the Joule effect. The temperature is controlled and regulated using a thermocouple outside the tube, at the level of the catalytic bed. A sampling septum placed between the exit from the reaction vessel and the vent is used to analyse the reaction products. All lines are kept at a temperature of about 150° C. by means of heating wires with thermal insulation consisting of braided silica wool so that products and reagents that have not reacted will not condense. Samples taken at the septum at regular time intervals using a 10 μl Hamilton syringe and analysed by gaseous phase chromatography, are used to monitor evolution of the reaction. The chromatograph used is a Varian 3800 model equipped with a Chrompack CP-WAX 52CB column (length 25 m, inside diameter 0.53 mm) and a Flame Ionisation detector. A computer provided with software supplied by Varian is used to control the temperature program and to process the signal sent by the detector (integration of peaks).

FIG. 8 shows the results of the catalytic tests. FIG. 8a gives the variation of the conversion of toluene for composites A, B and C, and for unsupported ZSM-5. Note that the conversion increases with the numbers of successive syntheses, and therefore with the quantity of ZSM-5 deposited. In the case of A, the conversion quickly drops before gradually stabilizing at 5%. The conversion in case B remains relatively stable for the first 60 minutes under flux but then finally drops to reach a conversion of the order of 11%. In case C, conversion remains stable at about 20% for a long time and only reduces by 3 to 4% after 3 hours under flux. The increase in conversion for unsupported ZSM-5 may be due to the formation of coke on zeolite.

FIG. 8b demonstrates the different reactivities for the three composites. It shows the selectivity for para-xylene with respect to the sum of the reaction products. In the case of A, the high initial selectivity of the order of 60% drops quickly to reach 45% after 60 minutes under flux. Selectivity then drops more slowly at about 5% per hour. The initial selectivity for para-xylene of sample B is of the order of 54% and is lower than for sample A, but it remains stable for the first 60 minutes under flux. Selectivity then drops at a rate of the order of 8 to 9% per hour. The selectivity of para-xylene in case C is stable at about 50% during the entire catalytic test. There is a small quantity of ethyltoluene or trimethylbenzene.

FIG. 8c shows the corresponding results for para-xylene selectivity compared with the three isomers ortho, meta and para. After 3 hours of reaction, the selectivity in para-xylene compared with the total quantity of xylene stabilizes at 61% for catalyst C, the conversion ratio of toluene stabilizes at about 20%, the efficiency in xylenes at 16%, and the WHSV (Weight Hourly Space Velocity) value at 4.8 h$^{-1}$. This value of WHSV was calculated on the total mass of composite used as a catalyst, whereas the active phase only represented about 15% of this total mass of composite.

The stability of unsupported ZSM-5 is identical but the selectivity is much lower than C, of the order of 30%.

The composite corresponding to sample C comprises about 15% of zeolite.

This test shows clearly two advantages of the use of a ZSM-5/SiC composite according to the invention, compared with known solid ZSM-5: the selectivity for paraxylene is higher, and the conversion per unit mass of ZSM (calculated from MAS-NMR spectra for $^{13}$C for the three composites) is better for ZSM-5/SiC.

Example 4

Preparation and Characterization of a Beta/SiC Composite

A composite comprising a Beta type zeolite (BEA structural type) is synthesized using a hydrothermal process from a gel containing all the necessary reagents, using a methodology described in the "Characterization of nanocrystalline zeolite Beta" by Camblor M. A. et al. in Microporous and Mesoporous Materials, vol. 25, p. 59–74 (1998), which is incorporated herein by reference in its entirety. The gel is composed of water and silica (SiO$_2$ Aérosil® 200, see explanation below), metallic aluminium and tetraethylammonium hydroxide (N(C$_2$H$_5$)$_4$$^+$.OH$^-$, abbreviation TEAOH). Its molar composition of oxide is:

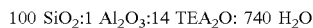

100 SiO$_2$:1 Al$_2$O$_3$:14 TEA$_2$O: 740 H$_2$O

The operating method is as follows: 3.87 g of Aérosil 200 is dissolved in 7.07 g of water and 10.13 g of TEAOH (aqueous solution with 35% of TEAOH by mass) at 50° C. with magnetic stirring in a polypropylene beaker. At the same time, 0.067 g of metallic aluminium is dissolved in another polypropylene flask in 5.65 g of TEAOH at 50° C. with magnetic stirring. When the solids have dissolved, the two liquids are mixed, still at 50° C. and with magnetic stirring, until a gel is obtained which is allowed to mature under the same temperature and stirring conditions for 50 minutes. 10 g of support (either extrusions, grains with size between 250 and 425 μm, or a β-SiC monolith (of the same type as used in Example 1), depending on the case, and previously calcinated at 900° C. for 2 h, is added to the gel. After 10 minutes of additional maturing, the complete mix is poured into a Teflon lined autoclave. The autoclave is then put in a drying oven at 140° C. for 24 h. The Beta/SiC composite obtained in washed with water, filtered and sonicated in Ethanol for 10 minutes to eliminate all gel not transformed into zeolite, and zeolite only weakly attached to the support, at the same time. The structure is broken down by calcinating the zeolite at 550° C. for 12 h under air. The NH$_4$-Beta/SiC form is formed after a cationic exchange of the composite by NH$_4$Cl (1M, 150 ml) in an aqueous solution. The acid form H-Beta/SiC is obtained after calcination at 550° C. for 12 h. The percentage of Beta zeolite on the support determined by a treatment with hydrofluoric acid (40% aqueous HF) is 10% by mass.

Different techniques are used to confirm that the composite is obtained:
X-ray diffraction on the previously ground Beta/SiC composite,
Scanning electronic microscope,
RAM-MNR for the $^{27}$Al nucleus,
Porosimetry by adsorption of nitrogen at the temperature of liquid nitrogen using the BET method.

According to information provided by its manufacturer, the Degussa AG company, the Aérosil® 200 silica used for preparation of the gel is a hydrophilic silica with a specific BET surface area of about 200 m$^2$/g and an average particle size of 12 nm.

Example 5

Test of the Catalytic Activity of the Beta/SiC Composite

The catalytic activity of the Beta/Sic composite obtained according to Example 4 was explored using the anisole acetylation reaction. This reaction synthesizes methoxyacetophenone, making acetic anhydride react on anisole in the presence of the catalyst according to the invention. The reaction products include a mixture of ortho, meta, para of methoxyacetophenone. The selectivity is determined with respect to the para isomer.

A mixture of acetic anhydride (2.8 ml, 0.03 mol) and anisole (7.5 ml, 0.06 mol) is heated to 120° C. at autogenic pressure in a schlenk flask (h=21 cm; d=3 cm) in the presence of 2 g of the Beta/SiC composite. More precisely during this test, the nature of the support is SiC in the form of an extrusion, the acidity of the zeolite is given by the Si/Al ratio and is equal to 50. 50 μl samples of the solution are taken at known times. The analysis is made by gas phase chromatography. The chromatograph is a 3400 cx Varian model equipped with an HP-Pona column (length 50 m, inside diameter 0.5 μm) and a FID (Flame Ionisation Detector) detector controlled by a computer on which software supplied by Varian is installed for interpretation of signals sent by the detector.

The results of this test are summarized in FIG. 9 that shows the variation in the concentration of p-methoxyacetophenone and the disappearance of acetic anhydride as a function of time.

The shape selectivity of the Beta/SiC zeolite is responsible for the strong selectivity of the reaction towards the disubstituted para form of methoxyacetophenone. Only the para isomer was detected, the concentration of the other two isomers was below the detection threshold of the apparatus. It can be deduced that the selectivity towards the para isomer was practically 100%.

Therefore, it can be seen that the Beta zeolite supported on β silicon carbide is a very good catalyst.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

All documents referred to herein are specifically incorporated herein by reference in their entireties.

As used herein and in the following claims, articles such as "the", "a" and "an" can connote the singular or plural.

We claim:

1. A composite comprising a zeolite deposited on a support, wherein the support comprises silicon carbide (SiC) with a specific BET surface area of at least 5 m²/g, wherein the support comprises a silicon carbide foam.

2. A composite according to claim 1, wherein the zeolite is selected from the group consisting of aluminosilicates, metallosilicates, silico-aluminophosphates, metallo-aluminophosphates, aluminophosphates, and metallophosphates.

3. A composite according to claim 2, wherein the zeolite has a structure selected from the group consisting of AEL, BEA, CHA, CLO, ERI, EUO, FAU, FER, HEU, LTA, LTL, MAZ, MEI, MEL, MFI, MOR, MTT, MTW, MWW, OFF, PHI, SOD and TON, each according to the standard nomenclature of the International Zeolite Association.

4. A composite according to claim 2, wherein the zeolite is selected from the group consisting of zeolite ZSM-5, β-zeolite and silicalite.

5. A composite according to claim 1, wherein the support has been calcinated before the zeolite is deposited thereon.

6. A composite comprising a zeolite deposited on a support, wherein the support comprises silicon carbide (SiC) with a specific BET surface area of at least 5 m²/g, wherein the support has been calcinated before the zeolite is deposited thereon under conditions such that a layer of silica is formed with a thickness measured by XPS spectroscopy of between 1 and 10 nm.

7. A composite according to claim 6, wherein the layer of silica has a thickness of between 1.5 and 5 nm.

8. A catalyst or a catalyst support for chemical reactions in a gas and/or liquid medium comprising a composite as claimed in claim 1.

9. A catalyst or a catalyst support capable of use in cracking, alkylation, acylation or isomerization reactions of hydrocarbons comprising a composite as claimed in claim 1.

10. A catalyst or catalyst support capable for use for the methylation of toluene comprising a composite as claimed in claim 1.

11. A catalyst or catalyst support as claimed in claim 10, wherein the methylation leads to a selectivity of at least 60% of para-xylene with respect to the total quantity of xylene measured after said methylation has progressed for a duration of at least three hours.

12. A catalyst or catalyst support suitable for depollution of exhaust gas from combustion engines comprising a composite as claimed in claim 1.

13. A catalyst or catalyst support suitable for a Friedel-Crafts alkylation or acylation comprising a composite as claimed in claim 1.

14. A catalyst or catalyst support according to claim 13 for synthesis of para-alkoxyacetophenones.

15. A catalyst or catalyst support according to claim 14, wherein the para-alkoxyacetophenone is para-methoxyacetophenone.

16. A catalyst or catalyst support according to claim 14, wherein said catalyst or catalyst support is capable of providing a selectivity of para isomer in said synthesis of greater than 90%.

17. A method for catalysing a reaction comprising employing a catalyst comprising a composite as claimed in claim 1.

18. A process for preparing a composite formed from a zeolite deposited on an SiC support with a specific surface area of at least 5 m²/g, comprising:
(a) creating a surface layer of silica between 1 and 10 nm thick measured by XPS on said support by calcinations;
(b) putting said support in contact with a previously set gel that is capable of forming zeolite, and
(c) conducting a hydrothermal synthesis to form a zeolite.

19. A process according to claim 18, wherein said SiC support comprises β-SiC.

20. A process according to claim 18, wherein said support comprises β-SiC foam.

21. A process according to claim 18, wherein said support has a specific surface area BET of the order of 10 to 100 m²/g.

22. A process according to claim 18, wherein said calcinations is done at 900°C.

23. A process according to claim 18, wherein the thickness of said silica layer is from 1.5 to 5 nm.

24. A process according to claim 18, wherein said gel comprises tetraethoxysilane and water.

25. A composite obtainable by the process according to claim 18, wherein said SiC support comprises SiC foam.

26. A catalyst or catalyst support for chemical reactions in a gaseous or liquid medium comprising a composite of claim 25.

27. A catalyst or a catalyst support suitable for use in hydrocarbon cracking, alkylation, acylation or isomerisation reactions comprising a composite of claim 25.

28. A catalyst suitable for methylation of toluene comprising a composite of claim 25.

29. A catalyst suitable for use in a reaction that leads to selectivity of at least 60% of para-xylene with respect to the total quality of xylene measured after a reaction time of three hours comprising a composite of claim 25.

30. A catalyst or a catalyst support suitable for depollution of internal combustion engine exhaust gases comprising a composite of claim 25.

31. A catalyst or a catalyst support suitable for Friedel-Crafts alkylation or acylation comprising a composite of claim 25.

32. A catalyst of claim 31 for synthesis of para-alkoxyacetophenones.

33. A catalyst according to claim 32, wherein the para-alkoxyacetophenone comprises para-methoxyacetophenone.

34. A catalyst according to claim 32, wherein the selectivity of the para isomer is at least 90%.

35. A catalyst of claim 32, wherein the selectivity of the para isomer is at least 95%.

36. A composite comprising a zeolite deposited on a support, wherein the support comprises silicon carbide (SiC) with a specific BET surface area of at least 5 $m^2/g$.

37. A composite according to claim 1, wherein the silicon carbide comprises β-silicon carbide (β-SiC).

38. A composite according to claim 1, wherein the support is a rigid support with a specific BET surface area between 10 and 600 $m^2/g$.

39. A composite according to claim 38, wherein the support has a specific BET surface area between 10 and 100 $m^2/g$.

* * * * *